US012100276B2

(12) United States Patent
Jacob

(10) Patent No.: US 12,100,276 B2
(45) Date of Patent: Sep. 24, 2024

(54) IDENTIFYING REGIONS OF INTEREST IN AN IMAGING FIELD OF VIEW

(71) Applicant: SimpliSafe, Inc., Boston, MA (US)

(72) Inventor: Jacquilene Jacob, Yonkers, NY (US)

(73) Assignee: SimpliSafe, Inc., Boston, MA (US)

( * ) Notice: Subject to any disclaimer, the term of this patent is extended or adjusted under 35 U.S.C. 154(b) by 70 days.

(21) Appl. No.: 17/831,608

(22) Filed: Jun. 3, 2022

(65) Prior Publication Data
US 2023/0154296 A1 May 18, 2023

Related U.S. Application Data

(60) Provisional application No. 63/280,478, filed on Nov. 17, 2021.

(51) Int. Cl.
*G08B 13/196* (2006.01)

(52) U.S. Cl.
CPC . *G08B 13/19652* (2013.01); *G08B 13/19602* (2013.01); *G08B 13/19682* (2013.01); *G08B 13/19691* (2013.01)

(58) Field of Classification Search
USPC ......................................................... 348/143
See application file for complete search history.

(56) References Cited

U.S. PATENT DOCUMENTS

| | | | | |
|---|---|---|---|---|
| 8,068,986 | B1 * | 11/2011 | Shahbazi | H04L 63/126 702/14 |
| 10,462,365 | B1 * | 10/2019 | Keegan | H04N 23/951 |
| 2011/0228981 | A1 * | 9/2011 | Harres | G06T 7/75 382/103 |
| 2012/0057640 | A1 * | 3/2012 | Shi | H04N 19/61 375/240.26 |
| 2016/0300341 | A1 * | 10/2016 | Hay | G06F 3/04847 |
| 2016/0357014 | A1 * | 12/2016 | Beckman | B60J 3/04 |
| 2016/0358312 | A1 * | 12/2016 | Kolb, V | G06T 5/003 |
| 2017/0251366 | A1 * | 8/2017 | Perna | G06F 21/32 |
| 2019/0182411 | A1 * | 6/2019 | Brown | G06V 20/52 |

(Continued)

FOREIGN PATENT DOCUMENTS

JP 2020123400 A 8/2020

OTHER PUBLICATIONS

Cutler et al., Robust real-time periodic motion detection, analysis, and applications. IEEE Transactions on Pattern Analysis and Machine Intelligence, Aug. 2000; vol. 22, No. 8, pp. 781-796.

(Continued)

*Primary Examiner* — Nigar Chowdhury
(74) *Attorney, Agent, or Firm* — Pierce Atwood LLP

(57) ABSTRACT

The techniques described herein relate to computerized methods, systems and non-transitory computer-readable media for determining a plurality of regions of interest from an image of a scene for motion detection. The methods can include generating the regions of interest using image segmentation techniques and receiving user selection to designate one or more regions as motion detection zones. The methods can also automatically recommend motion detection zones. The methods can include subsequently capturing one or more images of a scene and performing motion detection in the one or more images of the scene using the designated motion detection zones.

35 Claims, 8 Drawing Sheets

(56) References Cited

U.S. PATENT DOCUMENTS

2019/0228532 A1* 7/2019 Smilansky ............ G06T 1/0007
2019/0318171 A1* 10/2019 Wang ................ G06F 18/24143

OTHER PUBLICATIONS

Feng et al., Deep multi-modal object detection and semantic segmentation for autonomous driving: Datasets, methods, and challenges. IEEE Transactions on Intelligent Transportation Systems. Feb. 17, 2020;22(3); 12 pages.
Ren et al., Faster r-cnn: Towards real-time object detection with region proposal networks. arXiv:1506.01497v3, Jan. 6, 2016; 14 pages.
Romera-Paredes et al., Recurrent instance segmentation. In European conference on computer vision Oct. 8, 2016; pp. 312-329.
International Search Report and Written Opinion mailed Apr. 18, 2023 for International Patent Application No. PCT/US2022/050037.

\* cited by examiner

IDENTIFYING REGIONS OF INTEREST IN AN IMAGING FIELD OF VIEW

CROSS-REFERENCE TO RELATED APPLICATIONS

This application claims the benefit under 35 U.S.C. § 119(e) of U.S. Provisional Application No. 63/280,478, filed Nov. 17, 2021, entitled "IDENTIFYING REGIONS OF INTEREST IN AN IMAGING FIELD OF VIEW," the entire contents of which are incorporated herein by reference.

TECHNICAL FIELD

Aspects of the technologies described herein relate to image segmentation systems and methods, and more particularly to systems and methods for identifying regions of interest.

BACKGROUND

Conventional home or building surveillance systems often use one or more image capturing devices to capture images of a scene around the home or building. Such surveillance systems can use the images to perform motion detection (e.g., by processing the images locally at the home or building and/or transmitting the captured images to a server). If motion is detected, the system can send an alert to a user and/or user device.

SUMMARY

The present disclosure relates to techniques for identifying one or more regions of a scene for motion detection. In some embodiments, the techniques provide computerized methods, systems, and/or non-transitory computer-readable media to perform: determining, using an automated image analysis technique, a plurality of regions from an image of a scene; displaying the plurality of regions; receiving user selection of one or more regions of the plurality of regions, the user selection is indicative of the one or more regions being designated as motion detection zones; and storing the one or more designated motion detection zones for performing motion detection on one or more subsequent images of the scene.

In some embodiments, the techniques provide computerized methods, systems, and/or non-transitory computer-readable media to perform: determining, using an automated image analysis technique, a plurality of regions from an image of a scene; determining a designation for the plurality of regions, wherein the designation is indicative of whether each of the plurality of regions is associated with triggering/non-triggering of motion detection; based on the designation for the plurality of regions, determine one or more of the plurality of regions as designated motion detection zones; and storing the one or more designated motion detection zones for performing motion detection on one or more subsequent images of the scene.

In some embodiments, the techniques provide computerized methods, systems, and/or non-transitory computer-readable media to perform: receiving from a communication network a plurality of regions of one or more images of a scene, wherein the plurality of regions are designated as image analysis zones; performing image analysis on the plurality of regions to detect presence of one or more events; in response to detecting a presence of at least one event in one of the plurality of regions designated as image analysis zones, sending an alert to the communication network, wherein the alert is indicative of the presence of the one event in the one of the image analysis zones.

In some embodiments, the techniques provide computerized methods, systems, and/or non-transitory computer-readable media to perform: receiving from a communication network a plurality of regions of one or more images of a scene; receiving from the communication network metadata containing information associated with the plurality of regions of the one or more images of the scene; and using the plurality of regions of the one or more images of the scene and the metadata to reconstruct at least one of the one or more images of the scene.

Various embodiments described herein may provide advantages over conventional systems in improving the performance of processing efficiency, processing speed and/or network latency. For example, for image reconstruction, the techniques described herein enable a camera and/or system to transmit only portions of the image in the regions of interest to a processing device (e.g., a server or cloud) for image reconstruction. In comparison to processing the whole image, this results in significant improvement in processing efficiency, network latency and processing speed. Other advantages of the various embodiments described herein include an easy-to-use tool, e.g., a user interface, that allows users to easily define the regions using automatic image segmentation techniques and/or recommendation techniques that recommend motion detection zones. These and other techniques for specifying regions of interest will be further described in the present disclosure.

BRIEF DESCRIPTION OF THE DRAWINGS

Additional embodiments of the disclosure, as well as features and advantages thereof, will become more apparent by reference to the description herein taken in conjunction with the accompanying drawings. The components in the figures are not necessarily to scale.

DETAILED DESCRIPTION

Figure 1:
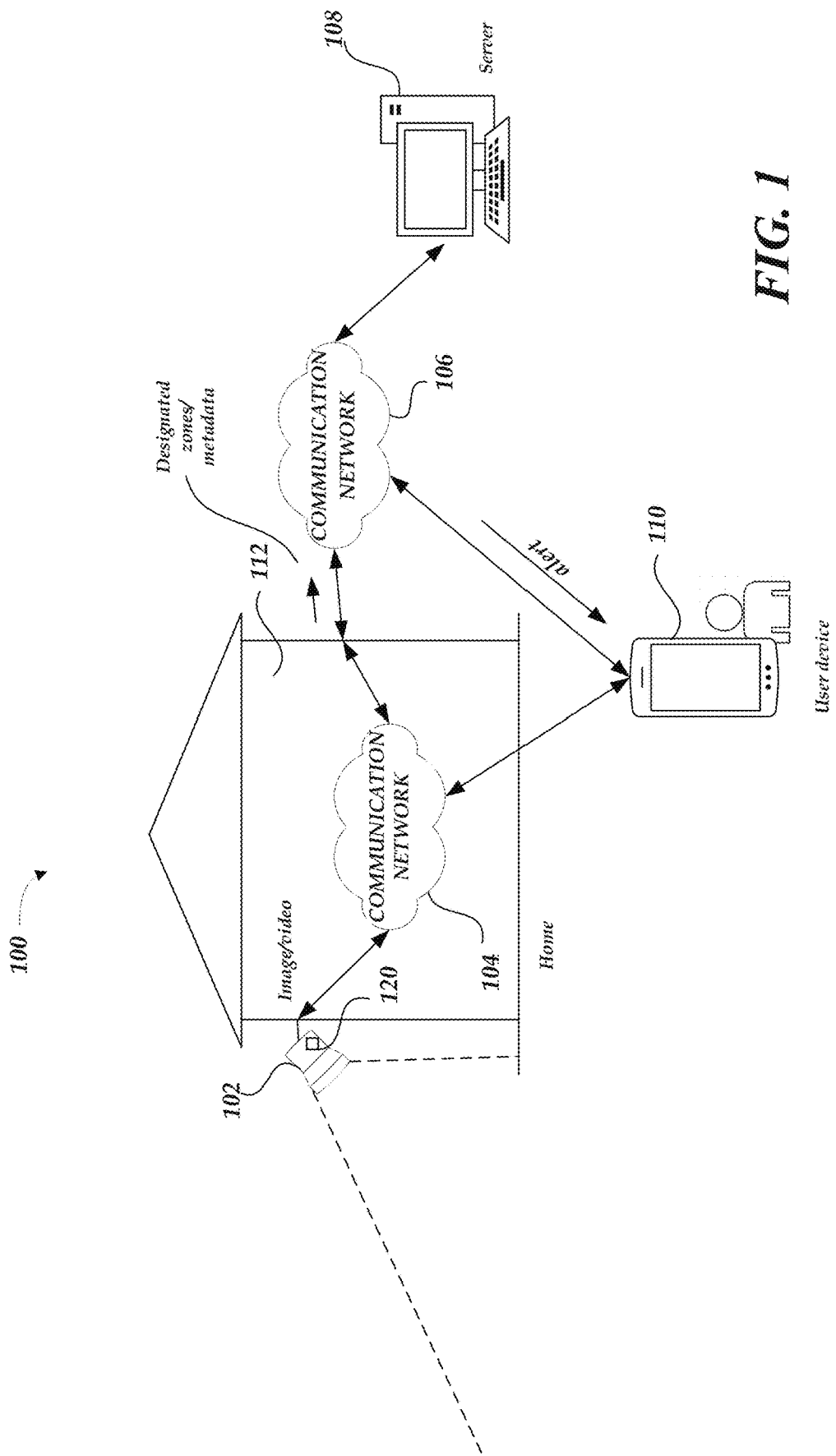
FIG. 1 is a diagram of an example system for identifying motion detection zones, according to some embodiments.

For the purposes of promoting an understanding of the principles of the present disclosure, reference will now be made to the embodiments illustrated in the drawings, and specific language will be used to describe the same. It will nevertheless be understood that no limitation of the scope of the invention is thereby intended.

Conventional security systems often use one or more image capturing devices installed on a premises to capture images of a scene. The systems can transmit the captured images to a server to perform motion detection. If motion is detected, the server can send an alert to a user device.

The techniques and systems described herein provide an easy-to-use tool to allow users to define one or more regions of interest. The region(s) of interest can be used for image reconstruction of a scene. The one or more regions of interest can additionally or alternatively be designated for further image analysis, such as motion detection in the reconstructed image. A region of interest can be specified according to its natural shape, as opposed to using a fixed or a predefined geometric shape (e.g., a rectangle), which can significantly reduce the number of pixels in an image that need to be processed by the system.

The techniques described herein may provide advantages over conventional systems in improving the performance of processing efficiency, processing speed and/or network latency. For example, for image reconstruction, the techniques described herein enable a camera and/or system to transmit only portions of the image in the regions of interest to a processing device (e.g., a server or cloud) for image reconstruction. Accordingly, in such configurations only a portion of a captured image, as opposed to the whole image, is used to reconstruct the regions of interest. As another example, when the region(s) of interest are used for image analysis (e.g., motion detection), the system can transmit only portions of the image to a remote location (e.g., server or cloud) to perform image analysis on those portions. In comparison to processing the whole image, this results in significant improvement in processing efficiency, network latency and processing speed.

Other advantages of the systems and methods described herein include an easy-to-use tool, e.g., a user interface, that allows users to easily define the regions using automatic image segmentation techniques and/or recommendation techniques that recommend motion detection zones. Since the shape of the region can be any shape as determined by the segmentation (e.g., and not constrained to a rectangular bounding box), the user can accurately specify a region of interest. Such techniques can also allow a user to easily select a region of interest (e.g., without being required to use a mouse to manually draw a freeform area as in some systems). These and other techniques for specifying regions of interest will be further described in the present disclosure.

In some embodiments, described herein are various techniques, including systems, computerized methods, and non-transitory instructions, that allow a user to select regions of interest as designated image analysis zone(s), such as motion detection zones. In some embodiments, the system can allow the user to select designated image analysis zones at a semantic region level. For example, the system can determine a plurality of semantic regions from an image of a scene and display the plurality of regions for the user to select/unselect as designated image analysis zones. A scene can include any surroundings around the house or building, or any structure to be monitored by the surveillance system. The scene can include outdoor or indoor areas, or a combination thereof. For example, a scene can include a street view in front of a house or building. A scene can also include a view of inside the house, such as the living room, bedroom and/or other areas in the house. A scene can likewise include any area inside a commercial building, such as a front desk area, a conference room, a secured area (e.g., a vault, a control room) in the building, and/or the like.

A semantic region in an image can include an area in which the pixels belong to semantically-related objects. For example, semantic regions for a scene around a home can include a front porch, a road, a lawn, a tree, a decoration item (e.g., plant box, flowers etc.) around the house, a pool, shrubs, patio furniture, etc. In some examples, the system can determine the plurality of regions using an automated image analysis technique. For example, the automated image analysis technique can include performing semantic segmentation configured to segment the image into multiple semantic regions. Once the plurality of segmented regions are displayed, the user can select/unselect (e.g., by clicking) these regions to designate/un-designate the regions as image analysis zones.

In some embodiments, the system can allow the user to select designated image analysis zones at a sub-region level, where a sub-region can represent an instance of an object in the image. For example, a semantic region can be a tree region, where the semantic region can include multiple sub-regions each representing an instance of trees (i.e., an individual tree). Similarly, a patio furniture region can include multiple sub-regions (instances) of patio furniture, and so on. In some embodiments, the system can perform instance segmentation on the plurality of segmented regions to associate each region with a respective class, e.g., trees, patio, furniture, front porch, pool, etc., and identify one or more sub-regions (instances) for each region. Once determined, the system can display the sub-regions (instances) of the regions, and the user can select/unselect each sub-region as a designated motion detection zone.

In some embodiments, the system can recommend an image analysis zone for a user. For example, the system can display a score associated with one or more regions in the scene, where the score is indicative of a likelihood of the region being useful as part of the ultimately designated image analysis zone. Then, the user can select the system recommended region(s) (or not) to determine the ultimate image analysis zone(s). In some embodiments, the system can automatically designate a region as an image analysis zone. In some embodiments, the system can designate a region as an image analysis zone based on a class that is associated with the region (e.g., walkways can be automatically designated as likely regions of interest for the image analysis zone). In some embodiments, the system can automatically designate a region as an image analysis zone based on prior activities in the region (e.g., if there is a lot of motion in one area, it can be designated as a region of interest for the image analysis zone).

In some embodiments, a designated image analysis zone can be associated with a zone type. For example, a designated zone can be a delivery zone where packages can be delivered, a pool zone that includes a pool (e.g., to detect motion to avoid children from entering the pool zone without adult supervision), an intruder zone (e.g., windows or front porch areas), a pet zone (e.g., an area in the back yard) etc. Each zone type can be associated with a set of one or more monitoring parameters. For example, for an intruder zone, the one or more monitoring parameters can include an event to be detected for image analysis, e.g., a motion. The one or more monitoring parameters can also include the time of the day for detecting the event. For example, for an intruder zone, the time for detecting the motion event can be 24 hours/7 days a week, evening hours/7 days a week, etc. For a delivery zone, the time for detecting the motion event can be normal business hours. Accordingly, outside the normal business hours, the system can be configured to not detect any event in the delivery zone, resulting in further reduction of network bandwidth use and computing power.

In some embodiments, once the user selects a region as designated motion detection zone, the user can also designate the zone with a zone type as described above. In some embodiments, the system can determine the zone type based on how the user reacts to alerts for that zone. For example, if the system is configured to provide an alert upon detection of motion in a zone via a call or text message to a user device, and in response to the alert the user dispatches the police (e.g., via a call to 911) from the user device, the system can designate the designated motion detection zone as an intruder zone. In another example, if the system is configured to provide an alert upon detection of motion in a designated motion detection zone via a call to a user device, but the user does not pick up the call, the system can designate the motion detection zone as one of non-urgent nature. Thus, the techniques described here herein also allows the zone type for a given designated motion detection zone to be initially determined and/or updated overtime based on future user responses.

In some embodiments, each zone type can be associated with one or more monitoring parameters. The monitoring parameter(s) associated with a zone type can be pre-determined. For example, for an intruder zone, the one or more monitoring parameters can include motion detection during all time on a 24/7 basis, wherein the one or more monitoring parameters for a delivery zone can include motion detection only during the day. In some embodiments, the system can determine/update monitoring parameter(s) for different zones based on prior activities for these zones. For example, if most of the triggers of motion in a delivery zone are detected during the day, then the system can determine the monitoring parameters for the delivery zone to include motion detection only during the day. In another example, a pool zone can mostly be active (with presence of frequent motions) during the summer in the afternoons. Thus, the system can determine the monitoring parameters for the pool zone to include motion detection during mornings and evenings.

In some embodiments, the system can capture one or more subsequent images of a scene using an image capturing device and transmit a portion of each of the images to a server for processing rather than transmitting the whole image. The system can determine the portion of the image to transmit based on the designated image analysis zones. In transmitting the portion of the image(s), the system can transmit only the pixels of the image(s) in the designated zones. Additionally, the system can transmit metadata that describes the designated zones. For example, the metadata can include information about the pixels in the designated zones, such as the relative locations in the image. In some embodiments, the metadata can include any of the type of designated zone, the one or more monitoring parameters associated with the designated zone or a combination thereof. Additionally, and/or alternatively, the metadata can include extracted features that define the designated zones. For example, the metadata can include motion flow, histograms of colors, image pixel density, and/or direction of motion for a set of pixels. At the server, the system can reconstruct the image using the transmitted portion of the captured image(s) and the metadata.

The system can further detect one or more events in the reconstructed image in the one or more designated zones based on the monitoring parameter(s) associated with each designated zone. In the embodiments described herein, the reconstructed image is much more compressed than the whole captured image in that the reconstructed image include only pixels in the designated zones. In some embodiments, the system can send an alert to a user device in response to detecting an event. An alert can also include a type, and the system can send the alert according to the alert type. In some examples, an alert type can include the communication means (e.g., a call, a text message, or other notification means) and/or the time for delivery (e.g., immediately; when user is available; at fixed time of the day; or on certain days).

As explained above, the techniques described herein can provide advantages over conventional systems in improving the performance of both processing speed and network latency. For example, the techniques described herein for designating image analysis zones, e.g., motion detection zones, enable the system to transmit only portions of the image in the designated image analysis zones and perform image analysis only on those portions. In comparison to transmitting and processing the whole image, this results in significant improvement in network latency and processing speed. Further, assigning different types of designated zones for image analysis, allowing different monitoring parameter (s) associated with different zones, and having different types of alert to be transmitted enables the system to transmit and process the captured image data in the most efficient way and save additional network bandwidth and computing resources. For example, allowing the user to define delivery zone that detects motion only during business hours reduces wasteful network and computing resource utilization during non-business hours. Additionally, the system provides an easy-to-use tool in a semi-automated or fully automated manner to designate the image analysis zones.

The technologies described herein can be generally used to identify regions of interest, with exemplary applications of the use of those regions in image reconstruction from captured images and motion detection. In motion detection applications, the system can identify designated motion detection zones for the system to perform motion detection in these designated zones. Thus, without limiting the scope of the disclosure, various embodiments are further described with examples in designating motion detection zones. Motion detection can include monitoring for a change in state of any object in the scene. Non-limiting examples of motion detection include tree swinging, people walking, birds flying, cars passing, leaves and/or any other objects moving in/out of the scene, etc.

Whereas various embodiments have been described, it will be apparent to those of ordinary skill in the art that many more embodiments and implementations are possible. Accordingly, the embodiments described herein are examples, not the only possible embodiments and implementations. Furthermore, the advantages described above are not necessarily the only advantages, and it is not necessarily expected that all of the described advantages will be achieved with every embodiment.

FIG. 1 is a diagram of an example system for identifying regions of interest (e.g., motion detection zones), according to some embodiments. System 100 can include an image capturing device (e.g., 102) configured to monitor a scene. As shown in FIG. 1, a camera 102 can be installed to monitor the front of the house. System 100 can also include one or more processing devices, e.g., server 108, user device 110, and/or one or more processors on board the camera. System 100 can additionally include one or more communication network (e.g., 104, 106) to provide communications among the one or more processing devices and the image capturing device. For example, in a home surveillance scenario, system 100 can include a home network 104 that establishes communications between the user device 110 and the camera 102. Home network 104 can also be configured to establish communications between the camera 102 and the Internet outside the home. In some embodiments, system 100 can also include communication network 106 that establishes communications between camera 102 and server 108 on the Internet, via communication network 104. Additionally, and/or alternatively, user device 110 can also be communicated to server 108 on the Internet via the communication network 106. In some embodiments, user device 110 can also communicate with imaging captured device (e.g., 102) via the home network 104. Each of the communication networks 104, 106 can be any suitable network, such as wired, wireless, mesh network, or any other suitable network. Although several network configurations are shown, it is appreciated that variations of these configurations can be possible.

With further reference to FIG. 1, system 100 can perform various operations to identify one or more motion detection zones. For example, operations can be performed inside the camera 102 or on a user device 110 or any other device, to analyze an image of a scene and identify one or more designated motion detection zones. Once the one or more designated motion detection zones are identified, the system can store these zones for a later process. In some embodiments, the system can store the designated motion detection zones on a storage device 120 on board the camera 102. Alternatively, and/or additionally, the designated motion detection zones can be stored in a user device (e.g., 110), or on a server (e.g., 108).

In some techniques described herein, system 100 can allow a user to select designated motion detection zones via a user interface. In some embodiments, the system can allow the user to select designated motion detection zones at a semantic region level. For example, the system can determine a plurality of semantic regions from an image of a scene and display the plurality of regions in a user interface for the user to select/unselect as designated motion detection zones. Various technologies can be implemented in the user interface to allow the user to select/unselect a region of interest (e.g., to designate/undesignated as a motion detection zone). For example, the multiple regions can be displayed as user selectable tiles that are distinguishable by graphical features, such as color, texture or other graphical representations. Each tile can be toggled between "selected" and "unselected" by user clicking on the tile. Other implementations can be possible for the user to select/unselect a region.

In some examples, the system can determine the plurality of regions using an automated image analysis technique. For example, the automated image analysis technique can include performing a semantic segmentation configured to segment the image into multiple semantic regions. Examples of semantic regions for a scene around a home can include the front porch, roads, lawn, trees, decoration items (e.g., plant box, flowers etc.) around the house, a pool, shrubs, patio furniture etc. Once the plurality of segmented regions are displayed, the user can select/unselect (e.g., by clicking) these regions to designate/un-designate the regions as motion detected zones.

In some embodiments, the system can include a user interface that allows the user to select designated motion detection zones at a sub-region level, where a sub-region can represent an instance of an object in the image. For example, a tree region can include multiple instances of trees each representing an individual tree. A patio furniture region can include multiple instances of furniture. The system can perform instance segmentation on the plurality of regions to associate each region with a respective class, e.g., trees, patio, furniture, front porch, pool etc., and identify one or more sub-regions (instances) for each semantic region. Once the instances are determined, they can be displayed in a user interface as sub-regions, and the user can select/unselect each sub-region as a designated motion detection zone, in a similar manner as selecting/unselecting a region as described above.

In some embodiments, the system can recommend a designation of motion detection zone for a region or sub-region (instance) to the user. For example, the system can display a score associated with a region, where the score is indicative of a likelihood of the region being useful as part of the ultimately designated motion detection zone. The user can select the system recommended region via a click in a user interface. In some embodiments, the system can automatically designate a region as a motion detection zone based on a class that is associated with the region. In some embodiments, the system can automatically designate a region as a motion detection zone based on prior activities in the region.

In some embodiments, the system can capture one or more subsequent images of a scene using an image capturing device, e.g., 102 and transmit a portion of each of the images to a server (e.g., 108) for processing rather than transmitting the whole image. The system can determine the portion of the image to transmit based on the designated motion detection zones. In transmitting the portion of the image(s), the system can transmit only the pixels of the image(s) in the designated motion detection zones. Additionally, the system can transmit metadata that describes the motion detection zones. For example, the metadata can include location of the pixels in the designated motion detection zones relative to the image(s) of the scene. Additionally, the metadata can include a type of zone assigned to each designated motion detection zone, one or more monitoring parameters associated with each type of zone, and/or an alert type associated with each designated motion detection zone, or a combination thereof.

At a server, e.g., 108, the system can reconstruct the image using the transmitted portion of the captured image(s) and the metadata. The system can further detect one or more events in the reconstructed image in the one or more designated motion detection zones. In some embodiments, the system can send an alert to a user device (e.g., 110) in response to detecting an event. The system can send the alert according to the type of alert. For example, the type of alert, which can be included in the metadata transmitted to the server, can include the communication means (e.g., call, text, or other notification means) and the time for delivery (e.g., immediately, when user is available, or at fixed time of the day, or on certain days). Various embodiments that can be implemented in system 100 are further described in detail with reference to FIGS. 2-7.

Figure 2:
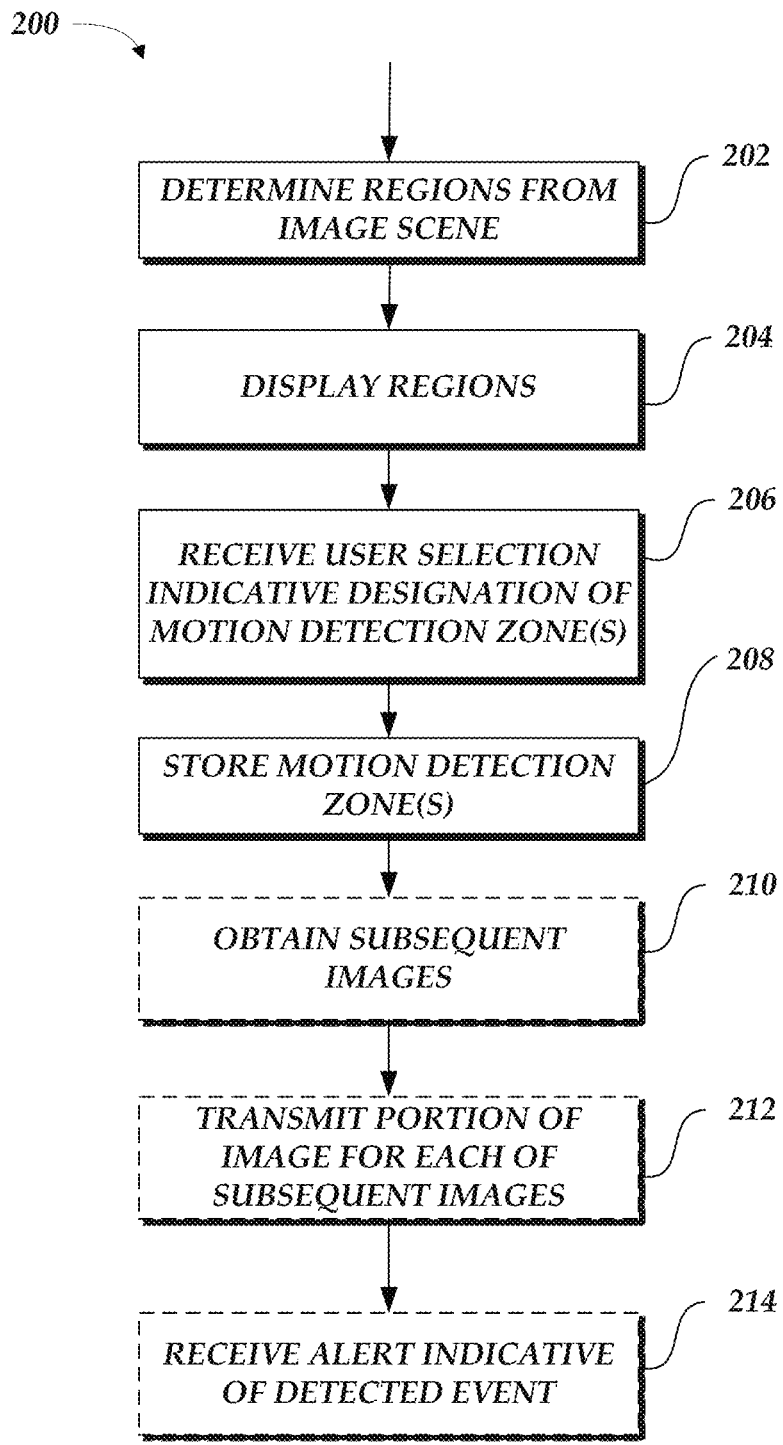
FIG. 2 is a flow chart depicting exemplary computerized methods for identifying motion detection zones using automated image analysis and user selection, according to some embodiments.
Figure 5:
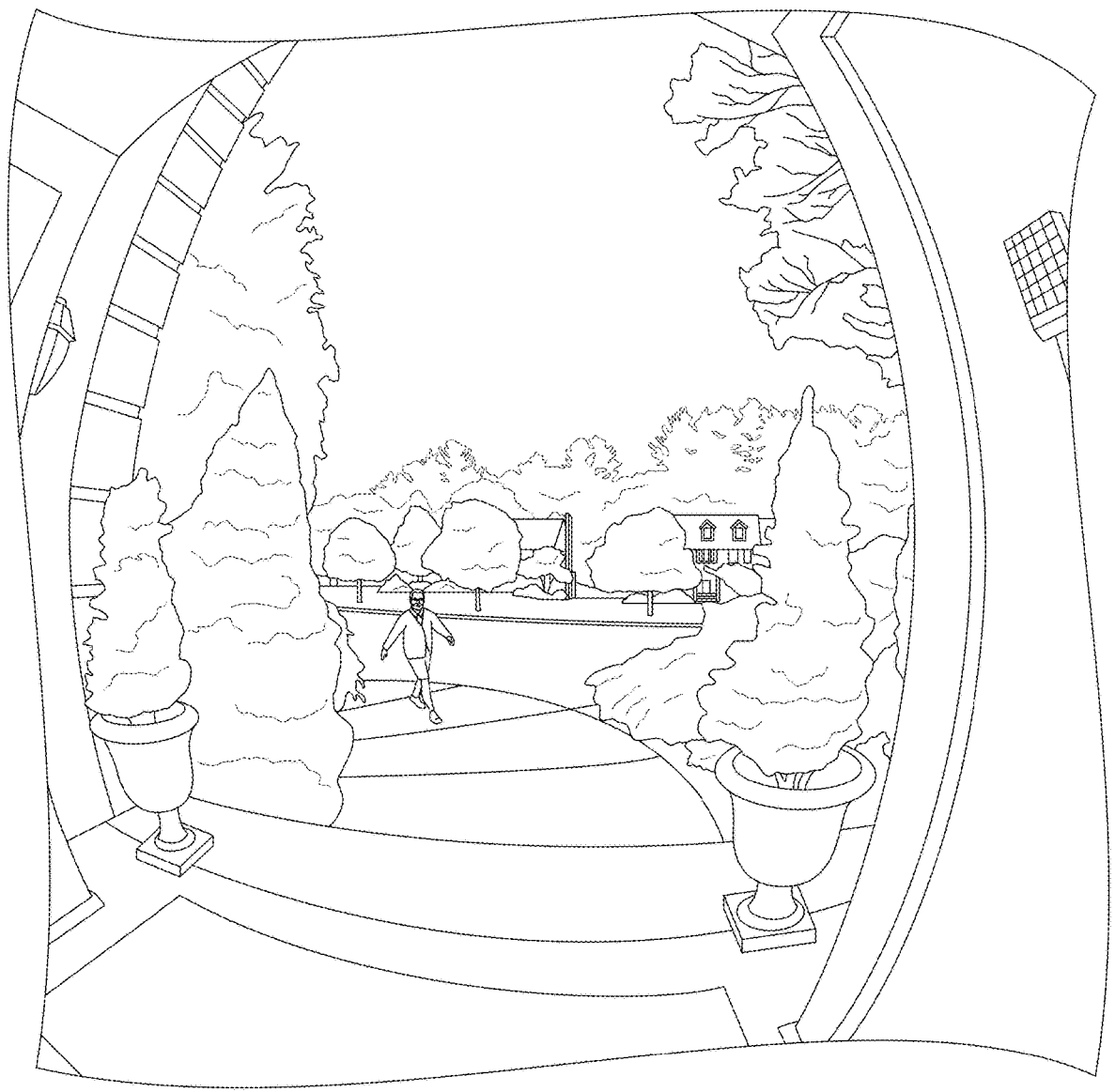
FIG. 5 is an example image of a scene captured from an image capturing device, according to some embodiments.

FIG. 2 is a flow chart depicting exemplary computerized methods for identifying motion detection zones using automated image analysis and user selection, according to some embodiments. In some embodiments, method 200 for identifying motion detection zones can be implemented in system 100 (FIG. 1), e.g., on user device 110. In other embodiments, method 200 can be implemented in a processor on board the camera (e.g., 102 in FIG. 1). In such case, the camera can have a processor. The camera can additionally have a build-in display. Alternatively, the system can have an external display communicatively coupled to the camera. In some embodiments, the display can be a touch screen configured to display the multiple regions and receive a user selection. In some examples used to describe the techniques herein, method 200 for identifying one or more regions of a scene for motion detection can include determining a plurality of regions from an image of a scene using an automated image analysis technique (act 202). Each region can represent an area of the scene the user might be interested in tracking motion, reconstructing image, and/or performing other image analysis. The image of the scene can be captured from an image capturing device, e.g., camera 102 (of FIG. 1). The camera can be installed to track motion in a scene the user is interested. In the example in FIG. 1, the camera 102 can be installed in the front of the house and configured to capture the scene in front of the house. An example image of a scene in front of the house is shown in FIG. 5.

In some embodiments, the image of the scene can be transmitted from the image capturing device (e.g., camera 102) to the user device 110 via the communication network 104 for processing. In such case, the user device can generate the plurality of regions in act 202. In other embodiments, the image of the scene can be transmitted to the server 108 via the communication network 106 for processing. In such case, a server, e.g., 108 of FIG. 1, can receive the image scene and generate the plurality of regions from the image scene. The server 108 can transmit the generated plurality of regions to the user device 110 via the communication network 106, where the user device can receive the plurality of regions generated by the server in act 202. In some embodiments, the camera (e.g., 102 in FIG. 1), which can include a processor configured to process the image(s) of the scene to generate the plurality of regions. Thus, the user device can receive the plurality of regions generated by the camera in act 202.

Figure 6:
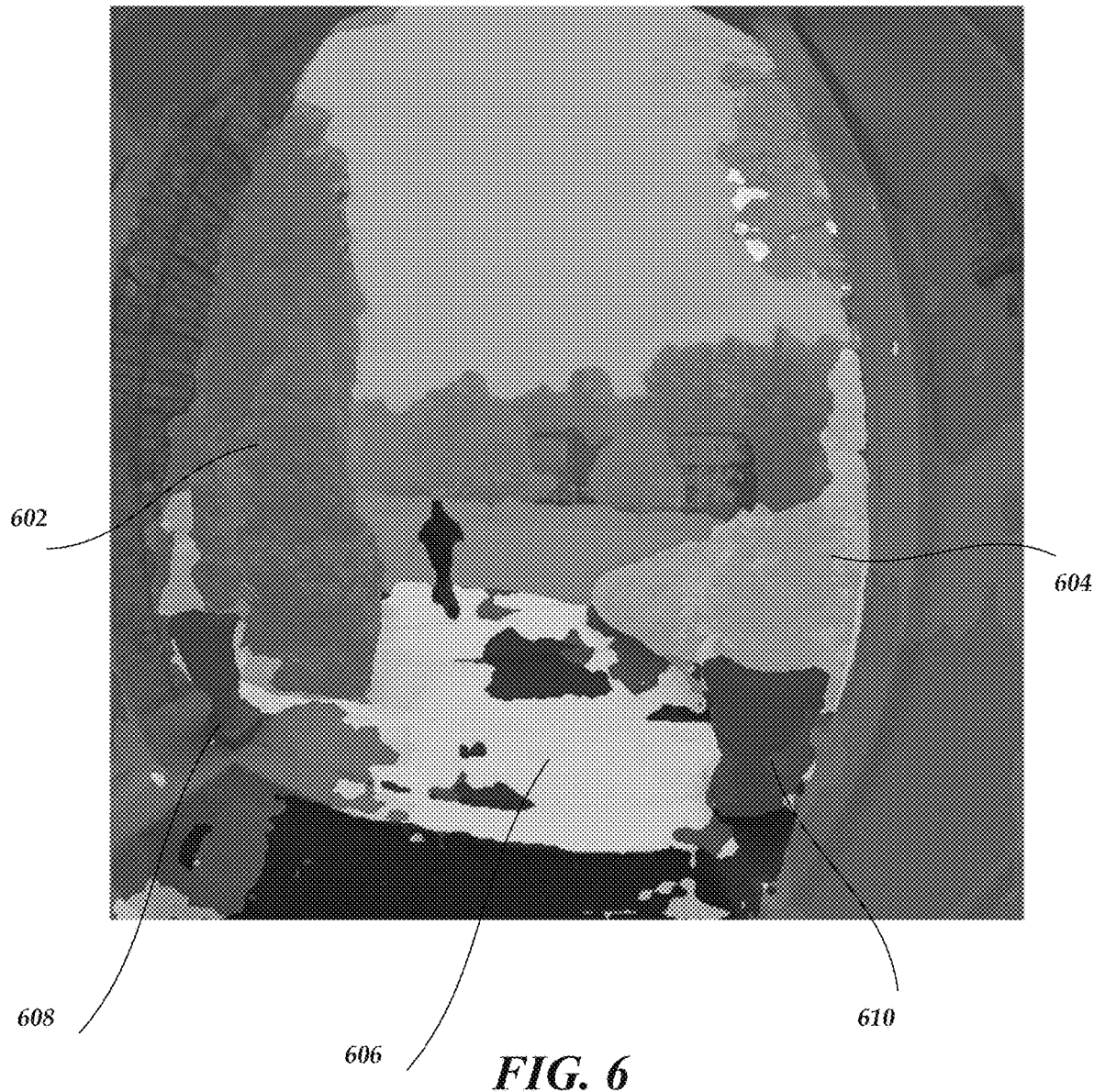
FIG. 6 illustrates examples of multiple regions in a scene, according to some embodiments.

Accordingly, methods for identifying motion detection zones can include displaying the plurality of regions on the user device, e.g., 110 (FIG. 1) (act 204). FIG. 6 illustrates examples of the plurality of regions in a scene obtained from act 202, according to some embodiments. For example, the user device (e.g., 110 in FIG. 1) can display the multiple regions obtained from act 202 (FIG. 2). These multiple regions can be displayed in various ways. For example, as shown in FIG. 6, region 602 can be represented by a plurality of pixels comprising the region in a first color, e.g., green; and region 606 in a second color, e.g., yellow. It is appreciated that the colors of the various regions can be various in such a way that the multiple regions are visually distinctive to the user. Alternatively, other colors or gray scales can be used to represent the multiple regions. In some embodiments, other representations such as a bounding box, a texture, a graphical symbol, and/or any combination thereof can also be possible to represent the multiple regions. As shown in FIG. 6, the multiple regions, e.g., 602-610 each can be a region from the image in FIG. 5 that has a semantic meaning. For example, regions 602, 604 can represent tree regions in the image of the scene (e.g., FIG. 5); region 606 can represent the path in front of the house; and regions 608, 610 can represent the vases in the front porch areas.

In some embodiments, determining the plurality of regions (e.g., in act 202) can use a semantic segmentation technique. Semantic segmentation can include segmenting an image into a plurality of semantic regions. A semantic region can include pixels or portions of an image that are semantically related. For example, a semantic region can include background of a scene, foreground of a scene, a person, a pathway, trees, a porch, a pool, streets, a house, etc. In semantic segmentation, each pixel in the image can be classified into a respective region and pixels in semantically related areas in the image can be classified into the same region. In some embodiments, various image semantic segmentation techniques can be used to generate the multiple regions from an image of a scene. For example, a deep machine learning model, e.g., a neural network model, can be pre-trained and used. An input image can be provided to the pre-trained machine learning model, which is configured to output segmentation results using the input image. A training set comprising a plurality of training images can be used as training data. The training data can also include ground truth data that include ground truth semantic regions for each of the training images in the training data. A suitable training method, e.g., a gradient decent, can be used to obtain the machine learning model. In some examples, a method that can be used is described in S. Ren et al., "Faster R-CNN: Towards Real-Time Object Detection with Region Proposal Networks," arXiv:1506.01497, 2015 (https://arxiv.org/abs/1506.01497), which is incorporated herein by reference in its entirety.

Returning to FIG. 2, methods for identifying motion detection zones 200 can further include receiving one or more user selection indicative of designation of motion detection zones (act 206). For example, with reference to FIG. 6, a user can click/unclick each of the segmented regions (e.g., 602-610) to indicate whether one or more of the displayed multiple regions should be designated as motion detection zones. In some embodiments, the segmented regions can be overlaid on the image of the scene so that the user can recognize these regions (e.g., side walk, front porch, tree etc.). As shown in FIG. 6, each of the regions typically has an irregular shape representing or corresponding to the natural shape of the semantic region, instead of a rectangular shape (e.g., a bounding box). This allows accurate representation of the region in the user interface so that the user can recognize and accurately determine whether the region should be designated as a motion detection zone. As will be described further in the present disclosure, representing a sematic region in its natural shape allows the system to process pixels only in that region in comparison to processing the region in a bounding box, which results in a saving of processing pixels in other areas the user is not interested.

In the example in FIG. 6, via a user interface on the user device (e.g., 110 in FIG. 1), the user can select a region, e.g., 606 (front porch), as a designated motion detection zone. In contrast, the user can skip (or unselect) other regions, e.g., 602, 604 (trees), in which false positives can be generated. For example, a wind can cause the trees to move and a detected motion event based on the movement of a tree can be a false positive. In some examples, the user can also select regions 608, 610 (sides of the porch) as non-designated motion detection zones because they contain structure or decorations of the house that are unlikely to be a target area for motion detection.

Returning to FIG. 2, once the user selection is received (at act 206), method 200 can proceed to store the user designated motion detection zones (act 208). In some embodiments, each of the user designated motion detection zones can be stored in any suitable representations, e.g., a bounding box, a contour, a plurality of pixels comprising the region, or a combination thereof. In some embodiments, the designated motion detection zones can be stored in a storage medium (e.g., 120) of the image capturing device (e.g., 102 in FIG. 1). In an example where the user device (e.g., 110 of FIG. 1) performs acts 202-206, the user device can transmit the user designated motion detection zones to the image capturing device (e.g., 102 in FIG. 1) for storing, for example, in a storage device (e.g., 120) installed in the camera (e.g., 102).

In various embodiments, each of the multiple regions obtained from act 202 can be associated with one of a plurality of classes. In some embodiments, each semantic region can also include a plurality of sub-regions, each representing an instance of an object in the image. For example, a tree region can include multiple instances, each being a sub-region and representing a respective tree. Accordingly, method 200 can perform both semantic segmentation and instance segmentation in act 202. Semantic segmentation is described previously. In addition, method 200 can perform instance segmentation on the plurality of semantic regions to associate each region with a respective class. Instance segmentation can be a process in which the system understands each of the semantic regions and assigns each region with a unique identification (ID), such as trees, front porch, pool, side walk etc. Additionally, instance segmentation can also determine one or more sub-regions (instances of objects) for each semantic region. In the above example, the instance segmentation can associate a TREE_ID with a tree region, and determine one or more sub-regions, for which the TREE_ID can have different values, for example, TREE_ID=1 for a first tree and TREE_ID=2 for a second tree. Various instance segmentation techniques can be used. For example, a method that can be used is described in Romera-Paredes B., Torr P. H. S., "Recurrent Instance Segmentation," In: Leibe B., Matas J., Sebe N., Welling M. (eds) Computer Vision—ECCV 2016. Lecture Notes in Computer Science, vol 9910, pp. 312-319. Springer, Cham., which is incorporated herein by reference in its entirety.

Figure 7:
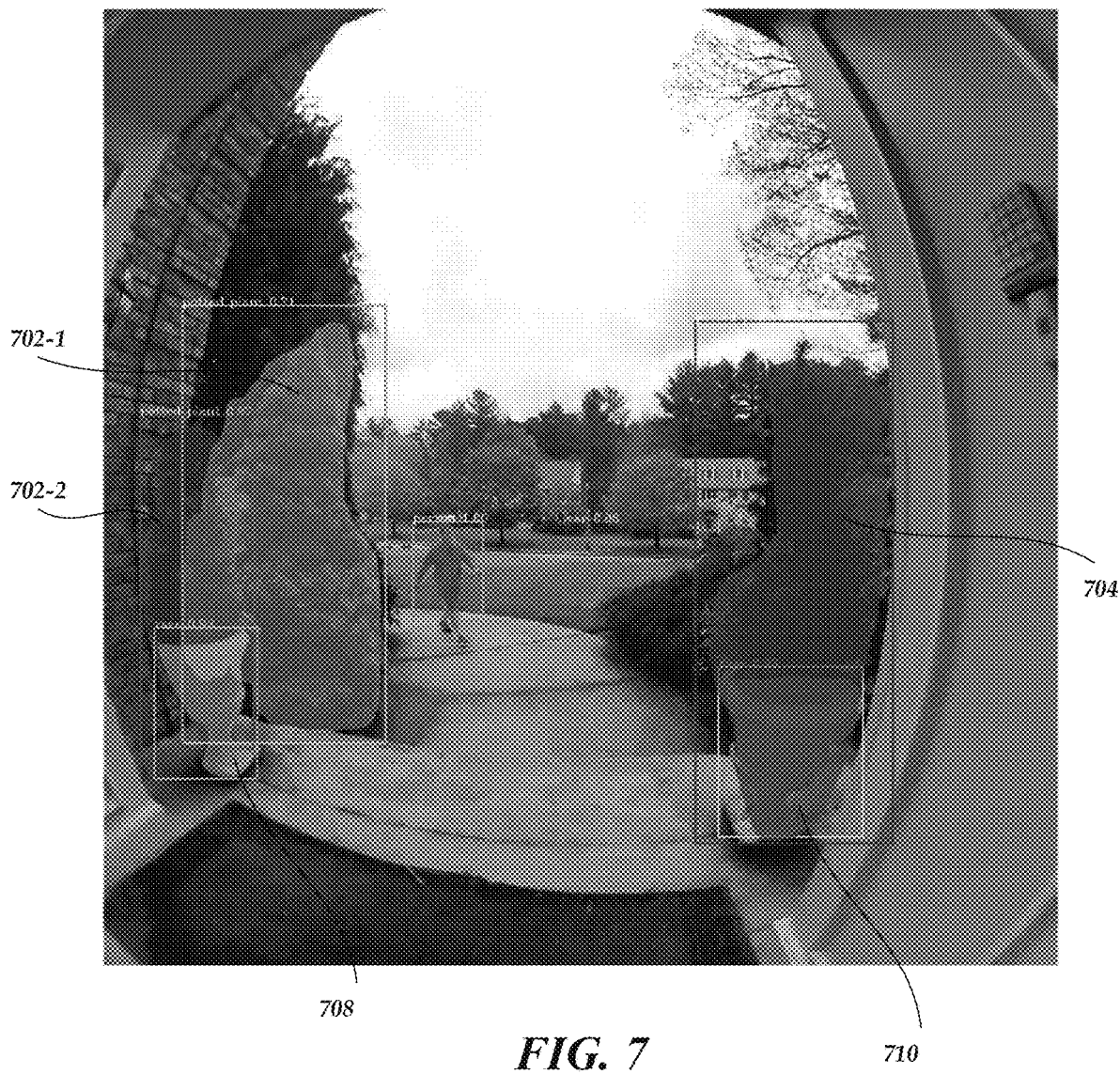
FIG. 7 illustrates examples of multiple regions in a scene, where each region is labeled with a class identification, according to some embodiments.

FIG. 7 illustrates examples of multiple regions or sub-regions (instances) in a scene, where each region or sub-region is labelled with a class, according to some embodiments. As shown in FIG. 7, area 602 in FIG. 6 can be segmented into sub-regions 702-1 and 702-2, each representing a respective instance of a detected object. In the example, 702-1 and 702-2 are instances of potted plants. Region 704 is classified from 604 into a potted plant; and regions 708, 710 are classified into vases. In the user interface, each segmented region can also be displayed and selected/deselected individually at an instance level. For example, the system can display one or more instances for each of the plurality of regions, and the user selection of one or more regions of the plurality of regions can also include user selection of one or more instances of a respective region, where the user selection of an instance is indicative of the instance of a respective region is being designated as a motion detection zone.

In some embodiments, method 200 can additionally generate information associated with each of the regions (for example, in act 202). This additional information associated with each of the regions can be used as an indicator guide or a recommendation for the user to designate a motion detection zone. For example, the system can recommend a region to the user as a designated motion detection zone by displaying (e.g., in act 204) the additional information associated with the region, where the information can be indicative of the likelihood of the region being useful as part of the ultimately designated motion detection zone. For example, a region associated with a low score value can be indicative that the region is unlikely to be a motion detection zone. A region associated with a higher score value can be indicative that the region is likely to be a motion detection zone. In some embodiments, the information that is indicative of the likelihood can be represented in other forms, such as a graphical representation. For example, a graphical symbol (e.g., circles, bars, stars, etc.) can be used to indicate the likelihood of the region being a motion zone.

In some embodiments, the determination of the information that is indicative of the likelihood of a respective region being useful as part of an ultimately designated motion detection zone can be based on a corresponding class that is associated with the respective region. In a non-limiting example, in response to a region being classified as a tree, a low score can be assigned to indicate that the tree area can be unlikely a motion detection zone. In another non-limiting example, in response to a region being classified as a front porch, a higher score can be assigned to indicate that the respective region can be likely a motion detection zone. In some embodiments, in act 204, method 200 can display, along with the plurality of regions, a score value or graphical representation associated with each of the regions. For example, the score value or graphical representation can be overlaid on each associated region.

In some embodiments, method 200 can determine that at least one of the plurality of regions should not be designated as a motion detection zone, if the at least one of the plurality of regions is associated with a first class; and not display the at least one of the plurality of regions. For example, method 200 can classify a region as a tree region (e.g., in act 202). Method 200 can determine that the tree region should not be designated as a motion detection zone, and thus, not display the tree region (in act 204). In other words, the determined tree region can automatically be removed from being displayed to the user. As a result, the tree region will not be designated as a motion detection zone. The method described herein can also be used to avoid other areas that may lead to false positives by not displaying these areas to the user, e.g., shrubs (which may move with wind), roads (with traffic moving), sky (with birds flying) etc.

Additionally, and/or alternatively, method 200 can automatically select designated motion detection zones based on the various techniques to be described with reference to FIG. 3, and display the recommended selection on the display. The system can allow the user to override the system recommended designated motion detection zones, by allowing the user to deselect. Similarly, the system can designate a region as a non-motion zone and display the non-motion zone as unselected. The system can allow the user to override by selecting the region as non-designated motion zone. The various techniques described herein for user selection can be implemented at both region (e.g., semantic region) and sub-region (e.g., instance of object) levels.

With further reference to FIG. 2, method 200 can additionally include using the stored regions of interest (e.g., designated motion detection zones obtained from act 208) in various applications. For example, method 200 can obtain subsequent one or more images of the scene from the image capturing device (e.g., 102 in FIG. 1)(act 210). Method 200 can subsequently transmit portions of the captured images to the server (e.g., 108 of FIG. 1) via communication network 106 (act 212). The portions being transmitted can include the user designated motion detection zones in the images, rather than the entire images. For example, method 200 can transmit only the pixels in the regions of interest (e.g., designated motion detection zones) to the communication network 106 while leaving out pixels in the images in other regions (e.g., non-designated motion detection zones). In a non-limiting example, an image mask containing pixels in the designated motion detection zones with zero padding in other regions can be used. In another non-limiting example, a plurality of pixels comprising a designated motion detection zone can be transmitted to the communication, along with metadata that describes the regions of interest (e.g., designated motion detection zone). For example, the metadata can include the location of pixels relative to the captured image in each region of interest.

Additionally, and/or alternatively, the metadata can also include the image size, or other information about the regions of interest. In some embodiments, the metadata can also include one or more monitoring parameters for a given designated motion detection zone. In some embodiments, the metadata can additionally include a type of alert for a given designated motion detection zone. Details of detecting events at designated motion detection zones will be described with reference to FIG. 4.

With further reference to FIG. 2, methods can also include receiving an alert from the communication network (e.g., from server 108 of FIG. 1) (act 214), if one or more events are detected in designated motion detection zones in the subsequent one or more images. Thus, an alert can be indicative of detected event in at least one designated motion detection zone. Now, FIG. 2 is further explained with an exemplary application.

In some embodiments, method 200 can include receiving, for a first region of the plurality of regions, first monitoring parameters; transmitting the first monitoring parameters to the communication network; and receiving a first alert from the communication network, the first alert is indicative of a detection of a first event in the first region in the one or more subsequent images of the scene based on the first monitoring parameters. In some examples, each designated motion detection zone can be associated with a respective type of zone. For example, a type of zone of a designated motion detection region can include a delivery zone, an intruder zone, a sidewalk, a street, a pool zone etc. In some embodiments, when the user selects a designated motion detect zone (e.g., in act 206), the user can also assign a type of zone for the selected region via a user interface.

In some embodiments, a type of zone can be associated with one or more monitoring parameters that indicate what and how an event is to be detected for that zone. For example, the one or more monitoring parameters can include the event to be detected, and/or the time for detecting the event. For example, a delivery zone can be associated with motion detection during normal business hours of delivery service. A pool zone can be associated with motion detection in non-playing hours, which can be any time during the day other than afternoons. Accordingly, for the delivery zone, method 200 can receive a first alert indicative of a detection of delivery during the delivery business hours (e.g., in act 214). Similarly, method 200 can receive a second alert indicative of a detection of motion in a pool area during non-play hours (e.g., in act 214).

In some embodiments, a different type of alert can be associated with a respective one of the multiple regions based on the type of designated motion detection zone. In other words, for a given designated motion detection zone, a different type of alert can be received in response to detection of an event in the given designated motion detection zone. In some embodiments, the alert type can include the form of delivery and/or the time of delivery. For example, an alert can be received in a call or a text message or other electronic means to the user device. The alert can also be delivered to the user device at different times. For example, if a motion detection zone is an intruder zone (e.g., a front porch area), the event to be detected in that zone can be considered urgent in nature. Following a detection of motion in the intruder zone, the user device can receive a call immediately. In another example, if the motion detection zone is a delivery zone, e.g., garage door, the event to be detected in that zone can be considered non-urgent. Thus, following a detection of an event in the delivery zone, the user device can receive a text message at or after the time when the delivery is detected.

Figure 3:
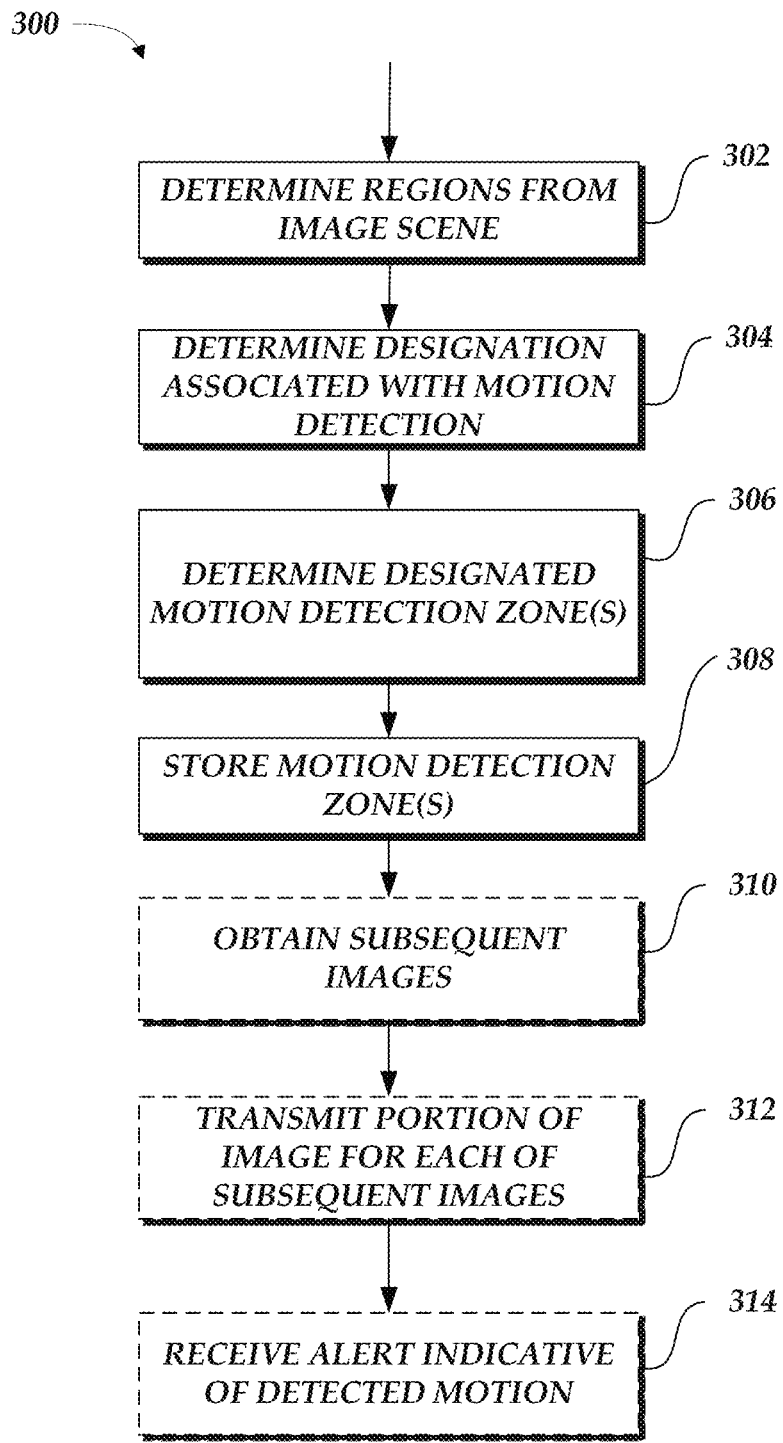
FIG. 3 is a flow chart depicting exemplary computerized methods for automatically identifying motion detection zones, according to some embodiments.

FIG. 3 is a flow chart showing an exemplary computerized method for automatically identifying motion detection zones, according to some embodiments. Method 300 for identifying motion detection zones can be implemented in system 100 (FIG. 1), e.g., on user device 110. In other embodiments, method 300 can be implemented in a processor on board the camera (e.g., 102 in FIG. 1). Method 300 can be similar to method 200 with the difference in that method 200 can automatically determine the designated motion detection zones without receiving user selection. In some embodiments, method 300 can determine a plurality of regions from an image scene (act 302) in a similar manner as act 202 in method 200 (FIG. 2). For example, method 300 can include performing semantic segmentation to segment the image of the scene into the plurality of regions; and performing instance segmentation on the plurality of regions to associate each region with a respective class of a plurality of classes. Method 300 can further determine one or more sub-regions for each of the plurality of regions, where a sub-region can represent an instance of an object in the image.

In some embodiments, method 300 can determine a designation for the plurality of regions (act 304), wherein the designation is indicative of whether each of the plurality of regions is associated with triggering/non-triggering of motion detection. Additionally, method 300 can determine one or more of the plurality of regions as designated motion detection zones based on the designation for the plurality of regions (act 306). Methods for determining a designation for the plurality of regions and designating motion detection zones in acts 304 and 306 are further described in detail herein.

In some embodiments, determining the designation of the plurality of regions in act 304 can include determining a designation for each of the plurality of regions based on an association of the class of the region with an indication of triggering/non-triggering of motion detection. For example, each of the classes from instance segmentation can be associated with an indication of triggering/non-triggering of motion detection. In a non-limiting example, a region classified as trees can be associated with an indication of non-triggering of motion detection because trees can easily trigger a motion detection when there is wind, where such detected motion can be a false positive. In another example, a region classified as front porch can be associated with an indication of triggering of motion detection because a detected motion in that region can indicate an arrival of an intruder or a visitor, or a delivery. Subsequently, in act 306, method 300 can determine a region as designated motion detection zone if the region is associated with an indication of triggering of motion detection. Conversely, method 300 can determine a region as non-designated motion detection zone if the region is associated with an indication of non-triggering of motion detection.

In some embodiments, the system can designate motion detection zone(s) based on prior activities around the house. For example, in the above example in act 304, determining the designation for a region that is indicative whether the region is associated with triggering/non-triggering of motion detection can be implemented based on prior motion detection results around the scene, where the prior motion detection results can be monitored and used in several ways. In some embodiments, the system can monitor the motion detection results for a particular region in a scene. For example, the system can monitor the frequency in which alerts are triggered in a particular region, e.g., front porch. If a number of alerts were triggered in that particular region in the past, the system can associate that region with triggering of motion detection. In other examples, if there is no alert received (e.g., no presence of motion is detected) for an extended period of time in a particular region, the system can associate that region with non-triggering of motion detection. This can be a scenario when the front porch, which is usually associated with delivery service, does not receive any deliveries because all of the deliveries are customarily made to a side entrance of the house. In such case, the system can automatically learn the past activities in a region around the house and use that information to associate the region with triggering/non-triggering of motion detection.

In some embodiments, the system can also determine the type of zone associated with a designated motion detection zone based on prior activities in that zone. For example, when an alert associated with a designated motion detection zone includes a call or text message to a user device, where the alert also caused the user to dispatch the police (e.g., via a call to 911) from the user device, the system can determine that the designated motion detection zone is an intruder zone. In another example, when an alert associated with a designated motion detection zone includes a call to a user device, where the user never picks up the call, the system can determine that the designated motion detection zone is a zone of non-urgent nature. Thus, the techniques described here herein also allows the type of zone for a given designated motion detection zone to be updated overtime.

Additionally, and/or alternatively, the system can also automatically determine/update monitoring parameter(s) associated with a region of using information about prior activities around the house. For example, for an intruder zone, the associated monitoring parameters can include motion detection during all time on a 24/7 basis, wherein the monitoring parameters for a delivery zone can include motion detection only during the day. These monitoring parameters for different zones can be determined based on prior activities for these zones. For example, if most of the triggers of motion in a delivery zone are detected during the day, then the system can determine the associated monitoring parameters for the delivery zone to include motion detection only during the day. In another example, a pool zone can mostly be active (with presence of frequent motions) during the summer in the afternoons. Thus, the system can determine the monitoring parameters for the pool zone to include motion detection during mornings and evenings. With further reference to FIG. 3, other acts, e.g., 308, 310, 312, 314 can be performed in a similar manner as acts 208, 210, 212, 214, respectively.

Figure 4:
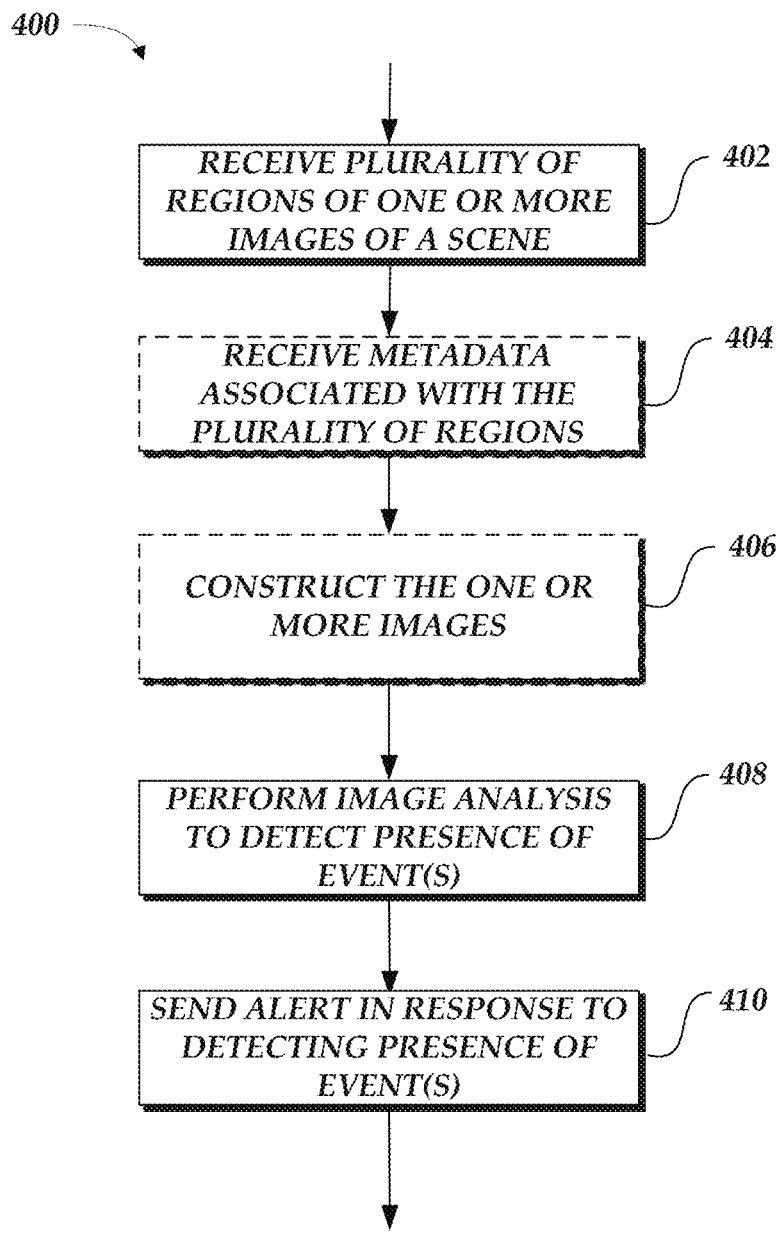
FIG. 4 is a flow chart depicting exemplary computerized methods for detecting presence of event(s) in one or more designated image analysis zones of a scene, according to some embodiments.

FIG. 4 is a flow chart showing an exemplary computerized method for detecting event(s) in one or more designated image analysis zones of a scene, according to some embodiments. Method 400 for detecting one or more events in subsequent one or more images of a scene and sending alerts can be implemented in a server (e.g., 108 of FIG. 1). Method 400 can include receiving a plurality of regions of one or more images of a scene (act 402). The images can be captured from an image capturing device (e.g., 102 of FIG. 1), where the plurality of regions can be designated as motion detection zones. For example, various embodiments of designating motion detection zones are described with reference to FIGS. 2 and 3. These designated motion detection zones can be stored in the image capturing device (e.g., 102 in FIG. 1). When subsequent one or more images are captured by the image capturing device, the plurality of regions designated as motion detection zones in the one or more images can be transmitted to the server (e.g., 108 of FIG. 1) via a communication network (e.g., 106) for processing.

In some embodiments, the plurality of regions received in act 402 can be portions of the images, where the portions of the images represent one or more designated motion detection zones. In some embodiments, method 400 can further include performing image analysis to detect event(s) in the designated motion detection zones (act 408). As previously described in the present disclosure, one or more monitoring parameters can be associated with each of the designated motion detection zone. For example, the monitoring parameters can include the type of event, e.g., motion, to be detected. The monitoring parameters can also include a time or time duration in which the event needs to be detected. In a non-limiting example, various methods can be used to detect motion in a designated motion detection zone. For example, a method can be used to detect presence of motion based on a difference between two or more successive images, where a change of pixels in the designated motion detection zones of the two or more successive images can indicate a presence of motion. In other embodiments, a machine learning model can be trained and used to detect presence of motion in an image. For example, a method that can be used is described R. Cutler and L. S. Davis, "Robust real-time periodic motion detection, analysis, and applications," in IEEE Transactions on Pattern Analysis and Machine Intelligence, vol. 22, no. 8, pp. 781-796, August 2000, which is incorporated herein by reference in its entirety.

In some embodiments, method 400 can optionally include act 404 to receive metadata associated with each of the plurality of regions. For example, as previously described, metadata associated with a region can include the location of pixels relative to the captured image in each designated motion detection zone. Additionally, the metadata can also include the image size, or other information about the designated motion detection zones. As previously described, the metadata can also include a type of the designated motion detection zone, e.g., an intruder zone, a pool zone, a delivery zone etc. Thus, method 400 can detect an event in a given designated motion detection zone (e.g., in act 408) based on the type of that motion detection zone, where the detection of the event can be performed based on the one or more monitoring parameters associated with the zone as previously described in the present disclosure. In some embodiments, the one or more monitoring parameters for each designated detection zone can be included in the metadata transmitted to the server via the communication network (e.g., 106 in FIG. 1). In other embodiments, the one or more monitoring parameters can be stored in a storage device of the system, and associated with the type of motion detection zone. In this case, given the type of each designated motion detection zone obtained in the metadata, the system can obtain the associated monitoring parameter(s) via a look-up table, for example. It is appreciated that other variations of storing and accessing the monitoring parameters for detection zones can also possible.

With further reference to FIG. 4, method 400 can further include sending one or more alerts (act 410) in response to detecting a presence of event(s) in the plurality of regions in act 408. For example, method 400 can send an alert to the communication network (e.g., 106 in FIG. 1), where the alert is indicative of a presence of an event in one of the designated motion detection zones. In return, the alert can be received by a user device (e.g., 110 in FIG. 1) via the communication network. As described previously in the present disclosure, the alert can be of a type, wherein the type of the alert is associated with the type of motion detection zone in which the event that triggered the alert is detected. In some examples, the type of alert associated with a motion detection zone can also be include in the metadata transmitted to the server.

In the example previously described in the present disclosure, method 400 can send an alert to a user device via a call or a text message or other electronic means depending on the type of the alert. For example, if the motion detection zone is an intruder zone (e.g., a front porch area), the event to be detected in that zone can be considered urgent in nature. In response to detecting a motion event in the intruder zone, the system can initiate a call to the user device immediately. In another example, if the motion detection zone is a delivery zone, e.g., garage door, the event to be detected in that zone can be considered non-urgent. Thus, in response to detection of an event in the delivery zone, the system can send a text message to the user device at or after the time when the delivery is detected.

With further reference to FIG. 4, method 400 can optionally reconstruct the one or more images of the scene (in act 406) using the portions of the images pertaining to the regions of interest (e.g., designated motion detection zones) and the metadata associated with each zone. For example, the portions of the images received in act 402 can include plurality of pixels for the regions of interest (e.g., designated motion detection zones), where the metadata received in act 404 can include locations of the plurality of pixels. In such case, method 400 can use the information about the location of each of the plurality of pixels to reconstruct the images of the scene with the regions of interest (e.g., designated motion zones) accurately positioned. Other regions (e.g., non-designated areas) in the images can be padded with zero (NULL) value pixels. This allows the subsequent processing (e.g., act 408) to be performed over the reconstructed images. It should be appreciated that variations of the embodiments described above in FIG. 4 are possible. For example, constructing the images (act 406) can be implemented as part of a motion detection system (e.g., including acts 408, 410). Alternatively or additionally, constructing the images (act 406) can be implemented in a stand-alone application. For example, method 400 can include acts 402, 404, 406 to reconstruct an image captured by a camera at the scene.

Additionally or alternatively, the system can use information associated with the plurality of regions to derive data that provides the system with a meaningful understanding of the real scene. For example, the segmentation techniques described above can associate each of the plurality of regions with a respective class (e.g., trees, sky, roads, patio, furniture etc.). This information about the association of class for the plurality of regions can be included in the metadata. In some embodiments, the server can receive the metadata (e.g., act 404) and use the metadata to infer the type of scenes. For example, if the plurality of regions are associated with trees, the sky, roads, etc., the system can use such information to determine or infer that the scene is an outdoor scene. If the plurality of regions are associated with chairs, couches, tables, etc., the system can use such information to determine or infer that the scene is an indoor scene. In some embodiments, the system can use the inference of the scene to determine a respective model for subsequent image analysis (e.g., motion detection). For example, in detecting motion, depending on the type of scene, the system can use different machine learning models for outdoor or indoor scenes. Thus, by using different models for different types of scenes, the system can perform motion detection or other image analysis operations with low latency, high accuracy and/or high efficiency.

Figure 8:
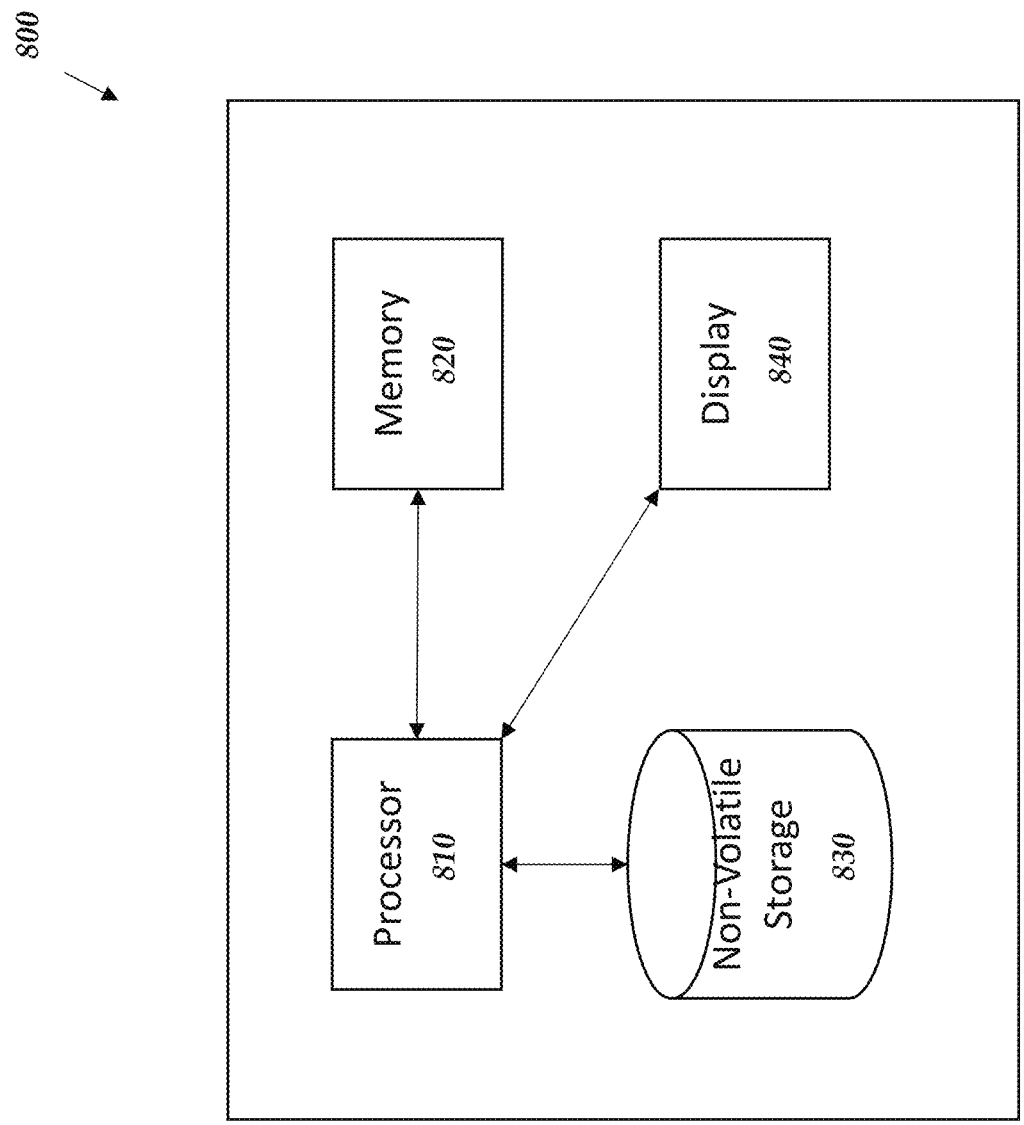
FIG. 8 shows an illustrative implementation of a computer system that can be used to perform any of the aspects of the techniques and embodiments disclosed herein, according to some embodiments.

An illustrative implementation of a computer system 800 that can be used to perform any of the aspects of the techniques and embodiments disclosed herein is shown in FIG. 8. For example, the computer system 800 can be installed in system 100 of FIG. 1, such as by server 110. In another example, the computer system 800 can be on board the image capturing device (e.g., camera 102). In another example, the computer system 800 can be installed in the user device (e.g., 110 of FIG. 1). The computer system 800 can be configured to perform various methods and acts as described in FIGS. 2-4. The computer system 800 can include one or more processors 810 and one or more non-transitory computer-readable storage media (e.g., memory 820 and one or more non-volatile storage media 830) and a display 840. The processor 810 can control writing data to and reading data from the memory 820 and the non-volatile storage device 830 in any suitable manner, as the aspects of the invention described herein are not limited in this respect. To perform functionality and/or techniques described herein, the processor 810 can execute one or more instructions stored in one or more computer-readable storage media (e.g., the memory 820, storage media, etc.), which can serve as non-transitory computer-readable storage media storing instructions for execution by the processor 810.

In connection with techniques described herein, code used to, for example, detect anomalies in images/videos can be stored on one or more computer-readable storage media of computer system 800. Processor 810 can execute any such code to provide any techniques for detecting anomalies as described herein. Any other software, programs or instructions described herein can also be stored and executed by computer system 800. It will be appreciated that computer code can be applied to any aspects of methods and techniques described herein. For example, computer code can be applied to interact with an operating system to detect anomalies through conventional operating system processes.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program," "software," and/or "application" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in non-transitory computer-readable storage media in any suitable form. Data structures may have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Various inventive concepts may be embodied as one or more methods, of which examples have been provided. The acts performed as part of a method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This allows elements to optionally be present other than the elements specifically identified within the list of elements to which the phrase "at least one" refers, whether related or unrelated to those elements specifically identified.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

Various aspects are described in this disclosure, which include, but are not limited to, the following aspects:

The invention claimed is:
1. A method, comprising:
receiving first pixel data corresponding to a first region within a field of view of a camera and second pixel data corresponding to a second region within the field of view;
determining that the first pixel data is indicative of a first event;
determining that first metadata associates the first region with a first form of delivery of an alert;
based at least in part on the first pixel data being indicative of the first event and the first metadata associating the first region with the first form of delivery, causing a first alert to be sent to an endpoint device using the first form of delivery;
determining that the second pixel data is indicative of a second event;
determining that second metadata associates the second region with a second form of delivery of an alert, wherein the second form of delivery is different than the first form of delivery; and based at least in part on the second pixel data being indicative of the second event and the second metadata associating the second region with the second form of delivery, causing a second alert to be sent to the endpoint device using the second form of delivery.

2. The method of claim 1, wherein:
causing the first alert to be sent to the endpoint device using the first form of delivery includes configuring the first alert to be output via a first application of the endpoint device; and
causing the second alert to be sent to the endpoint device using the second form of alert delivery includes configuring the second alert to be output via a second application of the endpoint device, wherein the second application is different from the first application.

3. The method of claim 2, wherein:
the first application is a phone application; and
the second application is text message application.

4. The method of claim 1, further comprising:
determining that the first metadata further associates the first region with a first timing of delivery of an alert; and
determining that the second metadata further associates the second region with a second timing of delivery of an alert;
wherein causing the first alert to be sent to the endpoint device further comprises, based at least in part on the first metadata associating the first region with the first timing of delivery, causing the first alert to be sent to the endpoint device immediately after determining that the first pixel data is indicative of the first event; and
wherein causing the second alert to be sent to the endpoint device further comprises, based at least in part on the second metadata associating the second region with the second timing of delivery, causing sending of the second alert to the endpoint device to be delayed after determining that the second pixel data is indicative of the second event.

5. The method of claim 1, further comprising:
determining that the first metadata further associates the first region with one or more first monitoring parameters;
based at least in part on the first metadata associating the first region with the one or more first monitoring parameters, causing the first pixel data to be processed using the one or more first monitoring parameters to detect the first event;
determining that the second metadata further associates the second region with one or more second monitoring parameters, wherein the one or more second monitoring parameters are different than the one or more first monitoring parameters; and
based at least in part on the second metadata associating the second region with the one or more second monitoring parameters, causing the second pixel data to be processed using the one or more second monitoring parameters to detect the second event.

6. The method of claim 5, wherein:
the one or more first monitoring parameters identify first windows of time during which the first pixel data is to be processed to detect events; and
the one or more second monitoring parameters identify second windows of time during which the second pixel data is to be processed to detect events, wherein the second windows of time are different than the first windows of time.

7. The method of claim 5, wherein:
the one or more first monitoring parameters identify a first type of event that is to be detected based on the first pixel data; and
the one or more second monitoring parameters identify a second type of event that is to be detected based on the second pixel data, wherein the second type of event is different than the first type of event.

8. The method of claim 5, wherein:
causing the first pixel data to be processed using the one or more first monitoring parameters further comprises sending the first pixel data to a remote computing system for processing; and
causing the second pixel data to be processed using the one or more second monitoring parameters further comprises sending the second pixel data to the remote computing system for processing.

9. The method of claim 8, further comprising:
refraining from sending, to the remote computing system, third pixel data that is included an image together with the first pixel data or the second pixel data.

10. The method of claim 9, further comprising:
sending, to the remote computing system, third metadata that identifies a relative position of the first pixel data or the second pixel data within the image.

11. The method of claim 8, further comprising:
sending, to the remote computing system, the one or more first monitoring parameters to cause the remote computing system to process the first pixel data in accordance with the one or more first monitoring parameters; and
sending, to the remote computing system, the one or more second monitoring parameters to cause the remote computing system to process the second pixel data in accordance with the one or more second monitoring parameters.

12. The method of claim 8, further comprising:
sending, to the remote computing system, a first indication that the first region is associated with the one or more first monitoring parameters to cause the remote computing system to process the first pixel data in accordance with the one or more first monitoring parameters; and
sending, to the remote computing system, a second indication that the second region is associated with the one or more second monitoring parameters to cause the remote computing system to process the second pixel data in accordance with the one or more second monitoring parameters.

13. The method of claim 1, wherein:
the first event corresponds to detected motion within the first region; and
the second event corresponds to detected motion within the second region.

14. The method of claim 1, further comprising:
determining, using an automated image analysis technique, a plurality of regions from an image of a scene, the plurality of regions including at least the first region and the second region;
displaying the plurality of regions;
receiving user selection of the first region and the second region from among the plurality of regions, wherein the user selection is indicative of the first region and the second region being designated as motion detection zones; and
storing first data designating the first region and the second region as motion detection zones for performing motion detection on one or more subsequent images acquired by the camera within the field of view.

15. The method of claim 14, further comprising:
displaying information in association with respective ones of the plurality of regions that indicates likelihoods that the respective ones of the plurality of regions will be useful as motion detection zones.

16. The method of claim 15, wherein the information that is displayed in association with the respective ones of the plurality of regions comprises respective score values or graphical representations associated with the respective ones of the plurality of regions.

17. The method of claim 14, wherein determining the plurality of regions further comprises:
performing semantic segmentation on the image of the scene to segment the image into the plurality of regions.

18. A system, comprising:
one or more processors; and
one or more non-transitory computer-readable mediums encoded with instructions which, when executed by the one or more processors, cause the system to:
receive first pixel data corresponding to a first region within a field of view of a camera and second pixel data corresponding to a second region within the field of view;
determine that the first pixel data is indicative of a first event;
determine that first metadata associates the first region with a first timing of delivery of an alert;
based at least in part on the first pixel data being indicative of the first event and the first metadata associating the first region with the first timing of delivery, cause a first alert to be sent to an endpoint device in accordance with the first timing of delivery;
determine that the second pixel data is indicative of a second event;
determine that second metadata associates the second region with a second timing of delivery of an alert, wherein the second timing of delivery is different than the first timing of delivery; and
based at least in part on the second pixel data being indicative of the second event and the second metadata associating the second region with the second timing of delivery, cause a second alert to be sent to the endpoint device in accordance with the second timing of delivery.

19. The system of claim 18, wherein the one or more non-transitory computer-readable mediums are further encoded with additional instructions which, when executed by the one or more processors, further cause the system to:
cause the first alert to be sent to the endpoint device in accordance with the first timing of delivery at least in part by causing the first alert to be sent to the endpoint device immediately after determining that the first pixel data is indicative of the first event; and
cause the second alert to be sent to the endpoint device in accordance with the second timing of delivery at least in part by causing sending of the second alert to the endpoint device to be delayed after determining that the second pixel data is indicative of the second event.

20. The system of claim 18, wherein the one or more non-transitory computer-readable mediums are further encoded with additional instructions which, when executed by the one or more processors, further cause the system to:
determine that the first metadata further associates the first region with one or more first monitoring parameters;
based at least in part on the first metadata associating the first region with the one or more first monitoring parameters, cause the first pixel data to be processed using the one or more first monitoring parameters to detect the first event;
determine that the second metadata further associates the second region with one or more second monitoring parameters, wherein the one or more second monitoring parameters are different than the one or more first monitoring parameters; and
based at least in part on the second metadata associating the second region with the one or more second monitoring parameters, cause the second pixel data to be processed using the one or more second monitoring parameters to detect the second event.

21. The system of claim 20, wherein:
the one or more first monitoring parameters identify first windows of time during which the first pixel data is to be processed to detect events; and
the one or more second monitoring parameters identify second windows of time during which the second pixel data is to be processed to detect events, wherein the second windows of time are different than the first windows of time.

22. The system of claim 20, wherein:
the one or more first monitoring parameters identify a first type of event that is to be detected based on the first pixel data; and
the one or more second monitoring parameters identify a second type of event that is to be detected based on the second pixel data, wherein the second type of event is different than the first type of event.

23. The system of claim 20, wherein the one or more non-transitory computer-readable mediums are further encoded with additional instructions which, when executed by the one or more processors, further cause the system to:
cause the first pixel data to be processed using the one or more first monitoring parameters at least in part by sending the first pixel data to a remote computing system for processing; and
cause the second pixel data to be processed using the one or more second monitoring parameters at least in part by sending the second pixel data to the remote computing system for processing.

24. The system of claim 23, wherein the one or more non-transitory computer-readable mediums are further encoded with additional instructions which, when executed by the one or more processors, further cause the system to:
refrain from sending, to the remote computing system, third pixel data that is included an image together with the first pixel data or the second pixel data.

25. The system of claim 24, wherein the one or more non-transitory computer-readable mediums are further encoded with additional instructions which, when executed by the one or more processors, further cause the system to:
send, to the remote computing system, third metadata that identifies a relative position of the first pixel data or the second pixel data within the image.

26. The system of claim 23, wherein the one or more non-transitory computer-readable mediums are further encoded with additional instructions which, when executed by the one or more processors, further cause the system to:
send, to the remote computing system, the one or more first monitoring parameters to cause the remote computing system to process the first pixel data in accordance with the one or more first monitoring parameters; and send, to the remote computing system, the one or more second monitoring parameters to cause the remote computing system to process the second pixel data in accordance with the one or more second monitoring parameters.

27. The system of claim 23, wherein the one or more non-transitory computer-readable mediums are further encoded with additional instructions which, when executed by the one or more processors, further cause the system to:
send, to the remote computing system, a first indication that the first region is associated with the one or more first monitoring parameters to cause the remote computing system to process the first pixel data in accordance with the one or more first monitoring parameters; and
send, to the remote computing system, a second indication that the second region is associated with the one or more second monitoring parameters to cause the remote computing system to process the second pixel data in accordance with the one or more second monitoring parameters.

28. The system of claim 18, wherein:
the first event corresponds to detected motion within the first region; and
the second event corresponds to detected motion within the second region.

29. The system of claim 18, wherein the one or more non-transitory computer-readable mediums are further encoded with additional instructions which, when executed by the one or more processors, further cause the system to:
determine, using an automated image analysis technique, a plurality of regions from an image of a scene, the plurality of regions including at least the first region and the second region;
display the plurality of regions;
receive user selection of the first region and the second region from among the plurality of regions, wherein the user selection is indicative of the first region and the second region being designated as motion detection zones; and
store first data designating the first region and the second region as motion detection zones for performing motion detection on one or more subsequent images acquired by the camera within the field of view.

30. The system of claim 29, wherein the one or more non-transitory computer-readable mediums are further encoded with additional instructions which, when executed by the one or more processors, further cause the system to:
display information in association with respective ones of the plurality of regions that indicates likelihoods that the respective ones of the plurality of regions will be useful as motion detection zones.

31. The system of claim 30, wherein the information that is displayed in association with the respective ones of the plurality of regions comprises respective score values or graphical representations associated with the respective ones of the plurality of regions.

32. The system of claim 18, wherein the one or more non-transitory computer-readable mediums are further encoded with additional instructions which, when executed by the one or more processors, further cause the system to:
determine that the first metadata further associates the first region with a first form of delivery of an alert; and
determining that the second metadata further associates the second region with a second form of delivery of an alert, the second form of delivery being different than the first form of delivery;
wherein causing the first alert to be sent to the endpoint device further comprises, based at least in part on the first metadata associating the first region with the first form of delivery, causing the first alert to be sent to the endpoint device using the first form of delivery; and
wherein causing the second alert to be sent to the endpoint device further comprises, based at least in part on the second metadata associating the second region with the second form of delivery, causing the second alert to be sent to the endpoint device using the second form of delivery.

33. The system of claim 32, wherein the one or more non-transitory computer-readable mediums are further encoded with additional instructions which, when executed by the one or more processors, further cause the system to:
cause the first alert to be sent to the endpoint device using the first form of delivery at least in part by configuring the first alert to be output via a first application of the endpoint device; and
cause the second alert to be sent to the endpoint device using the second form of delivery at least in part by configuring the second alert to be output via a second application of the endpoint device, wherein the second application is different from the first application.

34. The system of claim 33, wherein:
the first application is a phone application; and
the second application is text message application.

35. A method, comprising:
receiving pixel data corresponding to different regions within a field of view of a camera, the different regions including at least a first region and a second region;
identifying a plurality of events based on the pixel data, the plurality of events including at least a first event based on first pixel data corresponding to the first region and a second event based on second pixel data corresponding to the second region;
determining a plurality of forms of delivery of alerts and/or timings of delivery of alerts based the different regions, the plurality of forms of delivery and/or timings of delivery including at least a first form of delivery and/or a first timing of delivery based on the first region and a second form of delivery and/or a second timing of delivery based on the second region; and
based at least in part on the plurality of events and plurality of forms of delivery and/or timings of delivery, causing a plurality of alerts to be sent to an endpoint device, the plurality of alerts including at least a first alert for the first event and a second alert for the second event, the first alert being sent to the endpoint device using first form of delivery and/or in accordance with the first timing of delivery and the second alert being sent to the endpoint device using the second form of delivery and/or in accordance with the second timing of delivery.

* * * * *